(12) United States Patent
Longacre et al.

(10) Patent No.: US 7,212,922 B1
(45) Date of Patent: May 1, 2007

(54) METHOD OF DETERMINING A CLIMATE-BASED ACTIVITY INDEX AND BEST-TIME-TO RECOMMENDATION

(75) Inventors: Monisha Longacre, Smyrna, GA (US); Todd Richards, Marietta, GA (US)

(73) Assignee: The Weather Channel, Inc., Atlanta, GA (US)

( * ) Notice: Subject to any disclaimer, the term of this patent is extended or adjusted under 35 U.S.C. 154(b) by 37 days.

(21) Appl. No.: 11/013,830

(22) Filed: Dec. 16, 2004

(51) Int. Cl.
*G01W 1/00* (2006.01)
*G06F 19/00* (2006.01)

(52) U.S. Cl. .................................................. 702/3
(58) Field of Classification Search ................ 702/2–5; 705/1, 4, 5, 10
See application file for complete search history.

(56) References Cited

U.S. PATENT DOCUMENTS

| | | | |
|---|---|---|---|
| 4,725,886 A | 2/1988 | Galumbeck et al. | |
| 4,916,539 A | 4/1990 | Galumbeck et al. | |
| 5,140,419 A | 8/1992 | Galumbeck et al. | |
| 5,654,886 A | 8/1997 | Zereski et al. | |
| 6,018,699 A | 1/2000 | Baron et al. | |
| 6,209,026 B1* | 3/2001 | Ran et al. | 709/218 |
| 6,236,330 B1 | 5/2001 | Cohen | |
| 6,356,905 B1 | 3/2002 | Gershman et al. | |
| 6,360,172 B1* | 3/2002 | Burfeind et al. | 702/2 |
| 6,427,101 B1 | 7/2002 | Diaz et al. | |
| 6,498,987 B1* | 12/2002 | Kelly et al. | 702/3 |
| 6,542,825 B2 | 4/2003 | Jones et al. | |
| 6,584,447 B1* | 6/2003 | Fox et al. | 705/10 |
| 6,590,529 B2 | 7/2003 | Schwoegler | |
| 6,816,878 B1 | 11/2004 | Zimmers et al. | |
| 6,823,263 B1* | 11/2004 | Kelly et al. | 702/3 |
| 2001/0003846 A1 | 6/2001 | Rowe et al. | |
| 2002/0130899 A1 | 9/2002 | Ryan et al. | |
| 2004/0073482 A1* | 4/2004 | Wiggins et al. | 705/14 |
| 2005/0216324 A1* | 9/2005 | Maithell et al. | 705/8 |

FOREIGN PATENT DOCUMENTS

| | | |
|---|---|---|
| EP | 0 601 254 | 6/1994 |
| JP | 10332840 | 12/1998 |

(Continued)

OTHER PUBLICATIONS

Chakravarty, Dipto et al., Solution for the Internet and the Enterpirse, Building Rich-media Digital Asset Management Systems with XML, http://www.artesia.com/info_xml.html, Jan. 21, 2001, pp. 1-9.

(Continued)

*Primary Examiner*—Donald McElheny, Jr.
(74) *Attorney, Agent, or Firm*—Kilpatrick Stockton LLP

(57) ABSTRACT

A method of using climate data to determine activity index values for a given activity. One embodiment provides a method of more objectively determining the desirability of an activity based on climate data by determining an activity index value using a weighted-element type analysis. Multiple activity index values may be determined for different time periods and used to provide information useful in comparing the desirability of the different time periods for a given activity. The activity index values may be used to answer questions such as "what is the best month to visit Kingston, Jamaica" and "what is the worst season for allergies in Atlanta."

21 Claims, 7 Drawing Sheets

FOREIGN PATENT DOCUMENTS

WO          WO 9815122          4/1998

OTHER PUBLICATIONS

Chakravarty, Dipto, "Rich Media Storage, Solving High-end Storage Demands for Rich-media Assets," http://www.artesia.com/info_storage .html, Jan. 21, 2001, pp 1-5.

Harack, Tom. "Harnessing the Weather." Published in GolfBusiness Magazine, Sep. 2004. http://www.golfbusinessmagazine.com/pageview.asp?doc=1114.

Helal, S. et al., "A three-tier Architecture for Ubiquitous Data Access." Computer Systems and Applications, ACS/IEE International Conference ON. 2001. Beirut, Lebanon, Jun. 25-29 2001, Los Alamitos, CA, USA IEEE Comput. Soc., US, 25 Jun. 2001, pp. 117-180, XP010551207 ISBN: 0-7695-1165-1 *paragraph [0002]; figure 1*.

Melendez, W. A. et al. "The Upper Layers of the ISO/OSI Reference Model (Part II)" Computer Standards and Interfaces, Elsevier Sequoia. Lausanne, CH, vol. 5 No. 2, 1986, pp. 65-77, XP000814414 ISSN: 0920-5489 * paragraph [02.2]; fig 2.1*.

Petrou C and Al: "An XML-based, 3-tier Scheme for Integrating Heterogeneous Information Sources to the WWW." Proceedings. International Workshop on Database and Expert Systems Applications, XX, XX, 1999, pp. 706-710, XP002156322 *paragraph [0002]; figure 1*.

Stevens, L. "Consider Three-Tier Client/Server." Datamation, Technical Publishing Co. Barrington, US, vol. 42, No. 4. Feb 15, 1996, pp. 61-62, 64, XP001179561 ISSN: 0011-6963 *the whole document*.

Webpage, http://www.wunderground.com/about/.adinfo.asp, dated May 8, 1999 by the Wayback Machine, http://www.archive.org/web/web.php.

AccuWeather.com, dated Oct. 13, 1999 by the Wayback Machine, http://www.archive.org/web/web.php.

AccuWeather.com Affiliate Opportunities, Advertising. Webpage dated May 11, 2000 by the Wayback Machine, http://www.archive.org/web/web.php.

"Climatology," Published by Longitudes Group., 2003. http://www.longitudesgroup.com/climate.html.

"Application Development Using Interwoven," Version 1.1, Interwoven, Inc., pp. 1-11.

"Comprehensive Personalization and Content Management," Version 1.1, Interwoven, Inc., pp. 1-9.

"Databases and File Systems on the Web," Version 1.3, Interwoven, Inc., pp. 1-10.

"Next Generation Content Management, File Systems and Databases—The Hybrid Architecture," www.Interwoven.com/developer/products/hybric_arch.html, Nov. 7, 2000, pp. 1-3.

"Time-to-Web is Everything, Secure your Future with Interwoven," www.Interwoven.com/customers, Dec. 12, 2000, p. 12.

"Content Replication and Syndication," Version 1.3, Interwoven, Inc., pp. 1-8.

"Content Replication and Syndication, Mobilizing for the Content Explosion," www.Interwoven,com/developer/products/replication.html, Nov. 7, 2000, pp. 1-5.

"Interwoven Customers," www.Interwoven.com/customers/customers.html, Dec. 12, 2000, pp. 1-3.

"My Local Page," www.accuweather.com/adcbin/index, Feb. 22, 2000, pp. 1-2.

"Welcome to WeatherPager!, " http://weatherpager.com Feb. 22, 2000, p. 1.

"Welcome to WeatherPager!, " http://www.accuweather.com/www/vol5/weatherpager/features.html, Feb. 22, 2000, pp. 1-4.

"AccuDate(r)-The World's Largest Weather Database," http://www.accuweather.com/wx.accudata/index/htm, Feb. 22, 2000, pp. 1-2.

"Welcome to AccuWeather Direct (tm)," http://direct.accuweather.com/, Feb. 22, 2000, pp. 1-2.

"Sign Up For AccuWeather Direct (tm)," http://direct.accuweather.com/ewxsignup/signup, Feb. 22, 2000, p. 1.

"AccuWeather Direct (tm) Sample Products," http://direct.accuweather.com/eweather/samplesind.htm, Feb. 22, 2000, p. 1.

"Sign Up for AccuWeather Direct (tm)," http://direct.accuweather.com/eweather/terms.htm, Feb. 22, 2000, pp. 1-3.

"About AccuWeather Direct (tm)," http://direct.accuweather.com/eweather.about.htm, Feb. 22, 2000, p. 1.

"AccuWeather Direct (tm)," http://direct.accuweather.com/eweather.com/weather/sample.htm, Feb. 22, 2000, p. 1.

* cited by examiner

FIG. 4a

Location: Atlanta

Activity: Attending an outdoor sporting event

402. Table of Elements

| Elements (having a potential impact on attending an outdoor sporting event) | Element Influence Weight | Potential Values |
|---|---|---|
| Average Daily Temperature | 35% | 0, 10, 20, 30, 40, 50, 60, 70, 80, 90, 100, 110, 115, 120 (rounded average temperature in °F) |
| Average Monthly Precipitation | 25% | 0, .5, 1.0, 1.5, 2.0, 2.5, 3.0, 3.5, 4.0 (rounded average inches of rainfall) |
| Average Daily Dew Point | 15% | 50, 55, 60, 65, 70, 75, 80 (rounded average daily dew point in °F) |
| Average Wind Speed | 15% | 0, 5, 10, 15, 20, 25, 30, 35, 40, 45 (rounded average wind speed in mph) |
| Average Daily Cloud Cover | 10% | 0, 10, 20, 30, 40, 50, 60, 70, 80, 90, 100 (rounded average daily cloud cover in %) |
| Total | 100% | |

404. Table of Average Daily Temperature Element Value Contributions

| Average Daily Temperature | Element Value Contribution |
|---|---|
| 0 | -55 |
| 10 | -45 |
| 20 | -35 |
| 30 | -25 |
| 40 | -15 |
| 50 | 15 |
| 60 | 25 |
| 70 | 35 |
| 80 | 30 |
| 90 | 20 |
| 100 | 0 |
| 110 | -25 |
| 120 | -45 |

FIG. 4b

406. Table of Average Monthly Precipitation Element Value Contributions

| Average Monthly Precipitation | Element Value Contribution |
|---|---|
| 0 | 25 |
| .5 | 23 |
| 1.0 | 19 |
| 1.5 | 12 |
| 2.0 | 5 |
| 2.5 | 0 |
| 3.0 | -10 |
| 3.5 | -20 |
| 4.0 | -30 |

408. Table of Average Daily Dew Point Element Value Contributions

| Average Daily Dew Point | Element Value Contribution |
|---|---|
| 50 | 15 |
| 55 | 12 |
| 60 | 10 |
| 65 | 5 |
| 70 | 0 |
| 75 | -5 |
| 80 | -10 |

410. Table of Average Wind Speed Element Value Contributions

| Average Wind speed | Element Value Contribution |
|---|---|
| 0 | 15 |
| 5 | 12 |
| 10 | 10 |
| 15 | 5 |
| 20 | 0 |
| 25 | -5 |
| 30 | -10 |
| 35 | -20 |
| 40 | -35 |
| 45 | -50 |

FIG. 4c

412. Table of Average Cloud Cover Element Value Contributions

| Average Daily Cloud cover | Element Value Contribution |
|---|---|
| 0 | 9.5 |
| 10 | 10 |
| 20 | 10 |
| 30 | 9 |
| 40 | 8 |
| 50 | 7 |
| 60 | 6 |
| 70 | 4 |
| 80 | 2 |
| 90 | 1 |
| 100 | 0 |

414. Table of Impact Values for Each Element

| Elements | Element Influence Weight | Historical Value for Atlanta in the Spring | Historical Element Value Contribution | Impact |
|---|---|---|---|---|
| Average Daily Temperature | 35% | 70 | 35 | 12.25 |
| Average Monthly Precipitation | 25% | 5 | 23 | 5.75 |
| Average Daily Dew point | 15% | 60 | 10 | 1.5 |
| Average Wind speed | 15% | 15 | 5 | 0.75 |
| Average Daily Cloud cover | 10% | 30 (calculated from ave. 27 cloudy days in season) | 9 | 0.9 |
| | | | Index Value | 21.15 |

FIG. 5

Location: St. Thomas, US Virgin Islands

Activity: Visit

| Each Time Increment Occurring During the Time Span | Index Value |
|---|---|
| January | 45 |
| February | 50 |
| March | 45 |
| April | 10 |
| May | 10 |
| June | 20 |
| July | 30 |
| August | 30 |
| September | 35 |
| October | 35 |
| November | 40 |
| December | 45 |

METHOD OF DETERMINING A CLIMATE-BASED ACTIVITY INDEX AND BEST-TIME-TO RECOMMENDATION

TECHNICAL FIELD

The present invention relates to systems and methods of determining climate-based activity information and, more particularly, to systems and methods for determining index values and best-time-to recommendations for activities using climate information.

BACKGROUND OF THE INVENTION

The Internet is a rapidly developing source of information useful to consumers in planning their activities and travel. Weather and climate information are of particular interest in this planning. Unfortunately, the Internet sites that provide weather and climate information have generally focused on providing short term weather forecast information and have limited content for longer-term planning. Furthermore, consumers generally have to go through several layers of navigation before reaching information that is useful for planning purposes. For more information on the deficiencies of some current weather information services see U.S. patent application Ser. No. 09/766,295 to Ryan, et al. entitled "Weather Information Delivery Systems and Methods Providing Planning Functionality And Navigation Tools" published as U.S. Patent Application 20020130899 and U.S. patent application Ser. No. 09/707,335 entitled "Targeted Weather Information Delivery Systems and Methods;" now abandoned, both incorporated herein by this reference.

Weather and climate have a great influence on people's activity and travel planning. People rely on weather forecast and climate information when making decisions and planning their activities and often wonder and discuss the optimal times to do certain things (e.g., play golf, visit a particular city, plant trees or flowers). They frequently ask questions such as what is the best time to visit Colorado, what is the best time of year to vacation in Kingston, Jamaica, are conditions good for a vacation to Cancun, etc. Unfortunately, there is no comprehensive source that provides objectively based answers to these questions.

Guide books, almanacs, and travel planning guides may offer recommendations about the best and worst times of year to visit an area and may even mention times of the year that are better for certain activities, such as golf, than other times of year. One of the problems with these recommendations is that they are typically vague and have a high level of subjectivity. Furthermore, the recommendation information does not take into account the consumer's specific preferences. For example, one person may prefer playing golf in hot weather rather than cool weather, while another prefers playing in cool weather rather than hot weather, while yet another is relatively indifferent to the temperature as long as its within a certain range but is more sensitive to and does not enjoy playing in windy conditions.

Weather forecast information available on the Internet may also be useful in planning activities. However, this type of information is typically based on short term weather forecasts. Weather forecast based activity indexes currently provide activity specific information based mostly on short term forecasted weather conditions, such as a 10-day forecast. For example, golf indexes are available as a measure of a set of weather conditions that influence the game of golf, such as temperature, humidity, lightning conditions, wind conditions, and precipitation. This allows consumers to more easily plan their activities by giving consumers the short term forecasted weather information tightly integrated with golf information.

Weather forecasts typically involve very limited climate information. Climate information may be used as a check to tell when short term forecasts are far off. Typical forecasts are based on ground observations of current and recent weather conditions such as dew point, humidity, visibility, cloud cover, etc. Weather forecasts are also based in part on current and recent weather balloon data. Typically, weather forecasting systems combine the ground and weather balloon observation data in a computer model to create a weather forecast. This is done for multiple locations around the globe and forecasts are typically combined together to create a model of the global flow of weather around the planet. These forecast models are usually run and rerun four or five times a day to ensure that the information in the model is current. These weather forecasting and modeling techniques provide useful weather information for short term activity planning.

In spite of the many uses and benefits of the weather-based activity planning tools available, there continues to be a need for additional and more powerful activity planning functionality. Specifically, consumers desire a tool that can help them make longer term planning decisions based on climate data as well as other factors. Climate data, which is typically based on historical data, is useful in understanding expected weather conditions for a given location. Climate data is often important for making long term and more general predictions about the weather conditions. For example, some sources of climate data provide data for a set 30 year period, allowing predictions to be made about future years, e.g. the fact that the average temperature in Atlanta in August over a recent 30 years period was 92 degrees can be used to predict that next August in Atlanta will have daily temperatures somewhere around 92 degrees. Climate data is typically collected and maintained in 30 year sets of data and updated every ten years rather than on a rolling period. For example, some sources of climate data are currently using a data set that includes information compiled from 1970 to 2000. Thirty years of relatively recent data is typically enough to provide reliable averages but does not extend so far back that global shifts in climate skew the results. Generally, the dataset of climate data should encompass a range of years that is broad enough that it provides a representative picture of what usually happens and current enough to reflect recent climatology shifts.

Current planning systems and tools do not allow users to conveniently and easily see how climate data impacts activity planning. There is currently no source of weather information that provides a comprehensive tool for long term planning based on more general climate data. Accordingly, there is a need for a comprehensive source to provide climate-based activity and travel planning.

BRIEF SUMMARY OF THE INVENTION

The present invention meets the needs described above by providing a method of using climate data to determine activity index values for a given activity. These activity index values numerically illustrate the desirability of an activity and, because they may be calculated for different time periods, provide information useful in comparing the desirability of different time periods for a given activity. For example, a user wishing to determine the best time during the year to visit Kingston, Jamaica could calculate activity index values for visiting Kingston, Jamaica for each month of the year using one of several methods of the present invention. The user could then determine the best time to visit Kingston, Jamaica by comparing these activity index values for the different months and selecting the month or months having the best activity index value.

One embodiment of the present invention provides a method of more objectively determining the desirability of an activity based on climate data by determining an activity index value. The activity index value is a numerical representation of the desirability of the activity and may be based on a weighted element type analysis. In such an analysis, the activity index value is based on historical climate data for a list of elements where the elements are used because they have a potential effect on the activity. For example, chance of precipitation and temperature are elements that have the potential to affect the desirability of visiting Kingston, Jamaica. Each element is weighted or given an element influence weight to reflect its importance in the desirability calculation. For example, an element such as chance of precipitation may be given a higher weight than temperature in calculations for the activity of visiting Kingston, Jamaica, if the chance of precipitation has a greater effect on the desirability of visiting Kingston, Jamaica.

Another aspect of some embodiments of the present invention is normalizing the different potential values for the different elements used in an activity index calculation. In some embodiments, this is accomplished by determining the potential values for each element and assigning an element contribution value to each element potential value. In other embodiments, the use of potential values and element contribution values is used to incorporate user preferences into the calculation.

In some embodiments of the present invention, the list of elements, element influence weights, potential values of the elements, and element contribution values may be established as background calculation values. Once these values are defined for an activity, the activity index value can be calculated for that activity for a given time period, such as summer, using historical climate and non-climate data for that period. Accordingly, these values may be considered background calculation values and may be determined in advance, based, for example, on general desirability statistics and stored in a database. Alternatively, these values may be defined by user preferences or otherwise determined.

These and other aspects, features and advantages of the present invention may be more clearly understood and appreciated from a review of the following detailed description of the disclosed embodiments and by reference to the appended drawings and claims.

BRIEF DESCRIPTION OF THE SEVERAL VIEWS OF THE DRAWINGS

FIGS. 4A, 4B, 4C illustrate an exemplary determination of a climate-based activity index value.

FIG. 5 is an exemplary determination of a best-time-to recommendation based on climate-based activity index values.

DETAILED DESCRIPTION OF THE INVENTION

The present invention is directed towards a climate-based activity index. In some embodiments the climate-based activity index values are used to select the best or worst times to do certain activities in a given location.

A. Method of Calculating an Activity Index Value based on Historical Climate Data One embodiment of the present invention provides a method of determining an activity index value based on historical climate data. Accordingly, for a given location and activity, an activity index value may be calculated using historical climate data such as climate data on temperature, precipitation, humidity, cloud cover, dew point, pressure, lightning, wind speed, visibility, the number of sunny days per month, the number of rainy days per month, or number of snowy days per month.

One method of determining an activity index value based on historical-climate data according to the present invention involves first identifying a location, an activity and a time period. These items may be identified by retrieving them from a user, from a database, or by otherwise determining or retrieving them. Next, elements having a potential impact on the activity are determined and an element influence weight for each element is determined. The element influence weight is typically a value that indicates the potential impact of each element on the activity. Next, for each element, a historical value for the location and the time period and an element value contribution corresponding to the historical value are determined. Once these values have been determined, an activity index value is determined for the activity based on the elements, element influence weights, and the element value contributions, wherein each element value contribution is weighted in accordance with its corresponding element influence weight.

Figure 1:
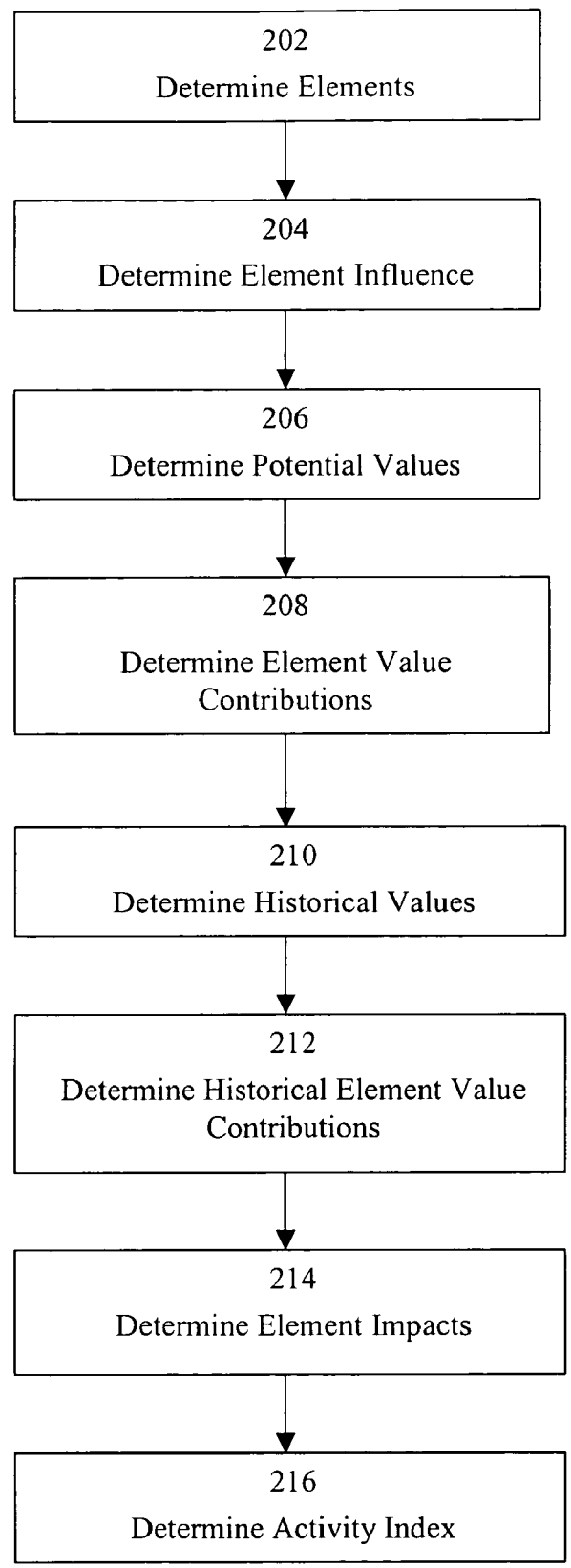
FIG. 1 is a logical diagram of an exemplary method according to one embodiment of the invention.

FIG. 1 is a logical diagram of an exemplary method according to one embodiment of the invention. As shown, the first four steps of this method essentially determine background values relevant to making the activity index value determination.

These values may be considered the background or setup calculation values because they may have been previously determined and stored. The values define or quantify the relationship between a particular activity and elements that may affect the desirability of that activity. Step 202 determines a list of elements, step 204 determines element influence weights, step 206 determines potential values for each of the elements, and step 208 determines element value contributions for each of the potential values of each of the elements.

The method shown in FIG. 1 next uses these values to make certain determinations. In step 210, historical values are determined for elements in the list of elements. Some elements correspond to climate and other elements correspond to non-climate information. In step 212, historical element value contributions are determined using the historical values and the element value contributions retrieved above. Next, in step 214, an element impact is determined for each element using the historical element value contributions. Finally, in step 216, the element impacts are used to determine an activity index value.

An alternative embodiment omits steps 206 and 208 and simply determines the historical element value contributions based on the historical values retrieved in step 210.

B. Method of Determining Background Calculation Values

Figure 2:
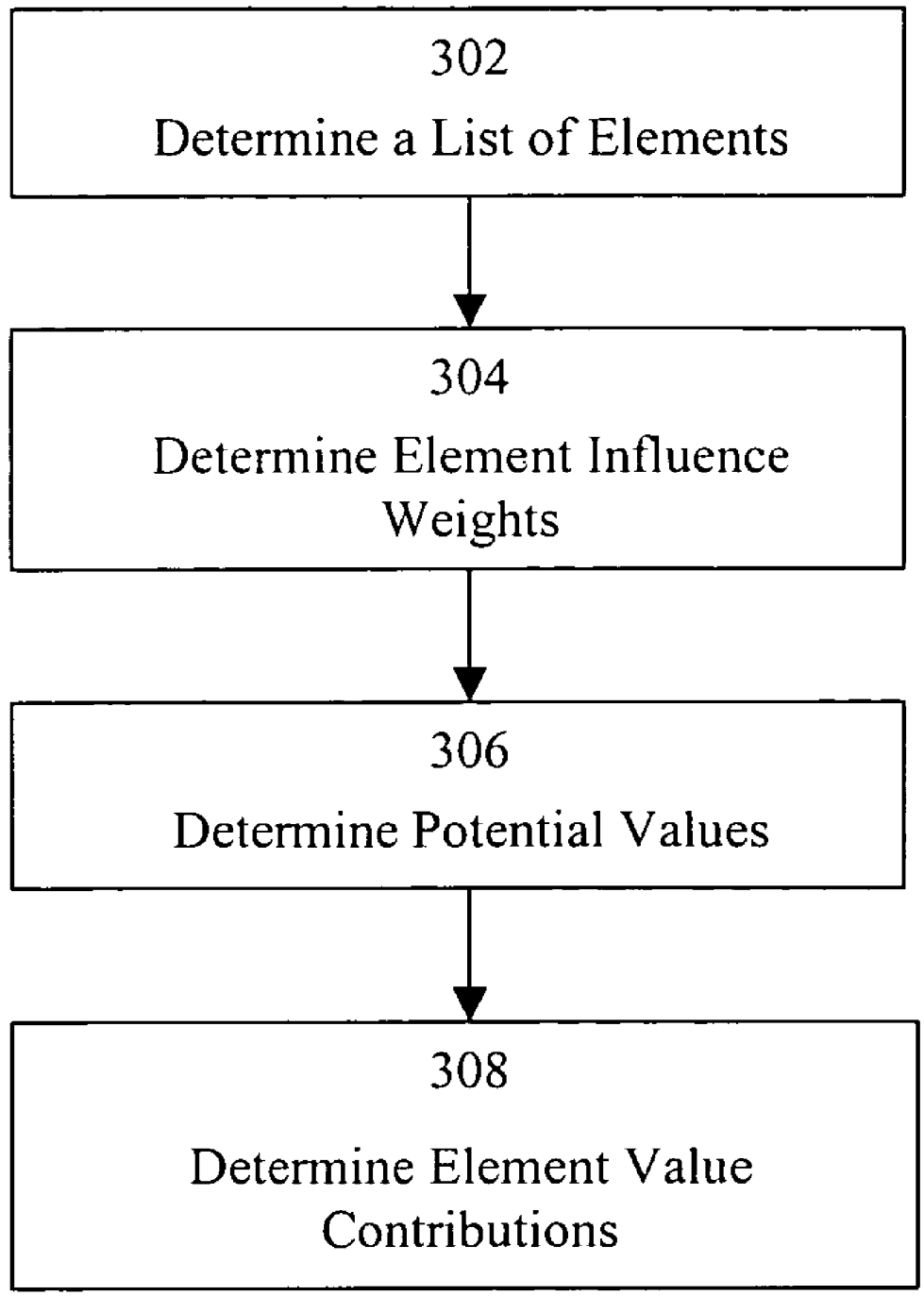
FIG. 2 is a logical diagram of an exemplary method of calculating background calculation values according to one embodiment of the invention.

Another embodiment of the present invention involves determining the background calculation values used in an activity index calculation such as the one described above. In some embodiments, these background calculation values for a particular activity include a list of elements, element influence weights, potential values for each element, and element value contribution values. FIG. 2 is a logical diagram of an exemplary method of determining background calculation values according to one embodiment of the invention. Step 302 shows determining a list of elements, step 304 shows determining element influence weights, step 306 shows determining potential values for the elements, and finally, step 308 shows determining element value contributions for each of the potential element values. Both the element influence weights and the element value contribution values are used for weighting. These values establish the weighting and normalization values that may be useful in determining an activity index value or otherwise assessing the desirability of an activity in certain weather conditions.

The method of determining background calculation values may utilize statistical information to determine these values. For example, the weighting of the different elements' influence weights and the element value contributions could be based on survey results in which survey takers indicated the relative importance of different elements, such as precipitation, humidity, temperature, etc., and the importance of varying potential conditions of those elements, such as whether a temperature of 90 degrees or 80 degrees is preferred, to a particular activity such as golf or visiting Kingston, Jamaica.

As one alternative, the method of determining background calculation values, such as the list of elements, element influence weights, potential values, and element value contributions, may utilize user preference information to make these determinations. In other words, one or more of these values may be based at least in part on the user's preferences. For example, a particular user may view temperature as more important than humidity to golf, while another user holds the opposite view. The background calculation values may be determined to take into account these individual preferences. For example, the values could be based on survey results from the individual user rather than survey values from large groups or other more general statistical data.

It should be noted that the determination of background calculation values may be made at the same time a user requests an activity index value or values. Furthermore, a user's preferences may be retrieved from the user as part of a request from the user for an activity index value or values. Alternatively, the user preference values could be retrieved from a stored database or other storage medium.

The element influence weights described above may take on a variety of values so long as the relative values of the different element influence weights for different elements indicate the relative importance of those elements to the activity. In one embodiment, the element influence weights are percentages that collectively add to 100 percent for each element. As a simple example, the list of element for an activity may include only four elements such as cloud cover, temperature, humidity, and chance of precipitation. For a given activity, the element influence weights could be 100, 100, 200, and 400 for cloud cover, temperature, humidity, and chance of precipitation, respectively. These values would indicate that humidity is twice as significant or important to the activity as temperature and cloud cover, and that chance of precipitation is twice as important as humidity and four times as important as temperature and cloud cover. Alternatively, the element influence weights could be the percentages 12.5%, 12.5%, 25%, and 50% for cloud cover, temperature, humidity, and chance of precipitation, respectively. Note that because these percentage values add to 100%, the element influence weight corresponds to the percentage importance a particular element has to an activity.

C. Sample Determination

Figure 3:
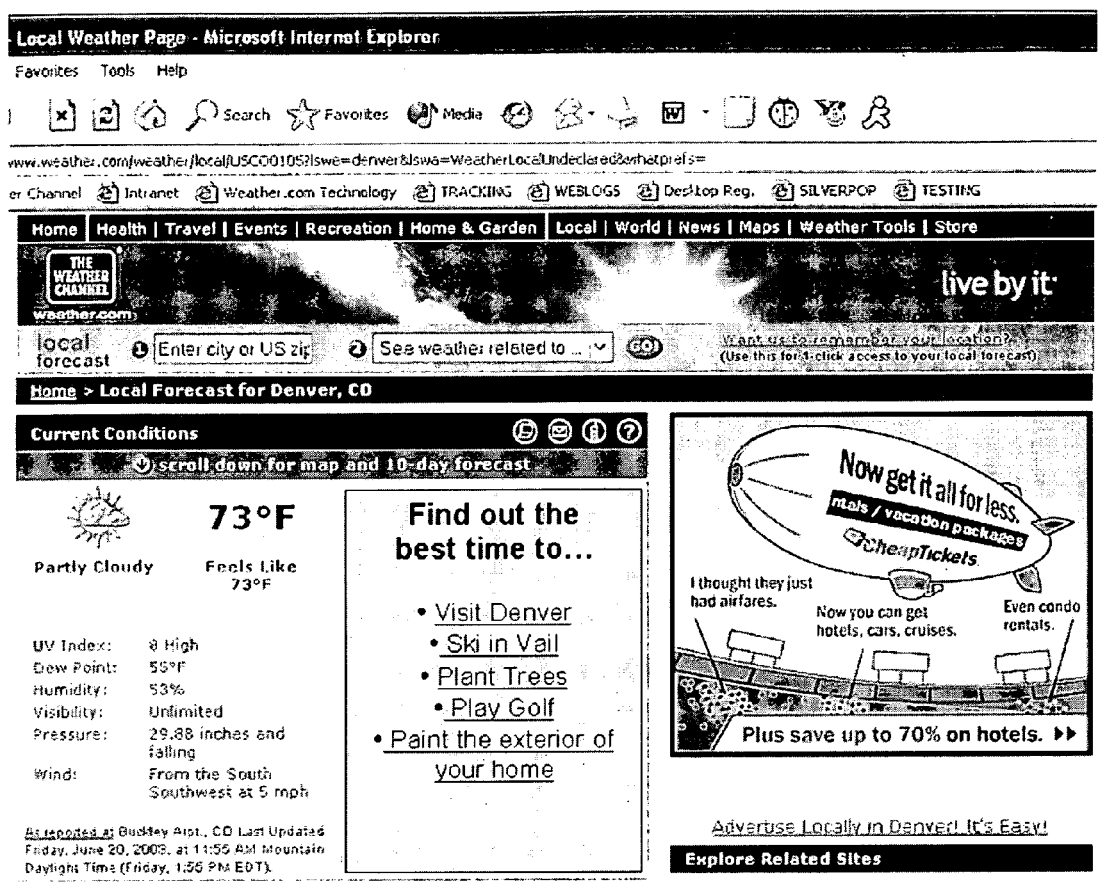
FIG. 3 is an exemplary webpage providing best-time-to information in accordance with an embodiment of the present invention.

FIG. 3 shows an exemplary webpage providing access to best-time-to information in accordance with an embodiment of the present invention. The webpage gives the user the ability to "find out the best time to . . . visit Denver, ski in Vail, plant trees, play golf, paint the exterior of your home." This list of activities may be determined based on information known or retrieved about the user's preferences. For example, the system may know that the user enjoys golf and therefore lists golf as one of the recommended best time to determinations. If the user selects one of the best time to determinations, then the best time to do that activity may be calculated, for example by the methods described below.

FIGS. 4A, 4B, and 4C illustrates a sample determination of an activity index value. Multiple activity index values could be determined in a similar manner and used to answer the question "what is the best time to attend an outdoor sporting event in Atlanta?" For example, an activity index value could be calculated for each of the seasons: spring, summer, fall, and winter. The season having the highest or best activity index value for that activity (attending a sporting event) in that location (Atlanta) may be chosen as the best season for that activity in that location. Alternatively, the activity index values could be calculated for each month, each weak, or any other time increment.

FIGS. 4A, 4B, and 4C shows the determination of an activity index value for spring. In the example, the location and activity are first identified. As shown, the location is Atlanta and the activity is attending an outdoor sporting event. Next, a list of elements having a potential impact on the activity is determined. These elements are shown in FIG. 4A in table 402. In this case, these elements are: average daily temperature, average monthly precipitation, average daily dew point, average wind speed, and average daily cloud cover.

An element influence weight is also retrieved for each element and shown in FIG. 4A in table 402. In this case, the element influence weight is 35% for average daily temperature, 25% for average monthly precipitation, 15% for average daily dew point, 15% for average wind speed, and 10% for average daily cloud cover. These element influence weights indicate the relative potential impact of each element on the activity. In this embodiment, the element influence weights are percentages that add to 100%. Thus, in this embodiment, the element influence weight corresponds to the percent importance the element is determined to have on the activity.

In this embodiment, potential values are also determined for each element and shown in FIG. 4A in table 402. These potential values or ranges provide discrete values to which the actual historical values can be rounded or otherwise associated. For example, with respect to the average daily temperature element, potential values of 0, 10, 20, 30, 40, 50, 60, 70, 80, 90, and 100 degrees Fahrenheit are used. Because temperature is measured on a scale that has infinite possible values, i.e. 0.1 degrees, 0.01 degrees, 0.001 degrees, etc., a few discrete values are used to represent all of the possible values and labeled potential values. In this example, the possible values are included in the closest potential value to which they round. In other words, the potential value "0" represents values less than 5, the potential value "10" represents values 5 or greater but less than 15, the potential value "20" represents values 15 or greater but less than 25, etc. In this way, each potential value or range is used to represent the different potential states of the element.

For each of the potential values, an element value contribution corresponding to it is determined. The relationship between the potential values and the element value contributions may be linear or non-linear. In the example shown in FIG. 4A in table 404, the average daily temperature element potential value "0" has an element contribution value of "−5," potential value "10" has an element contribution value of "−45," potential value "20" has an element contribution value of "−35," etc. These element value contributions define how the different potential values of each element impact the activity. The lower or more negative the value the less desirable that potential value is. For example, a "0" degree average daily temperature has a "−55" element value contribution value indicating that "0" degrees is less desirable than other potential values having a higher element value contribution, such as potential value "70" degrees, which has an element value contribution of 35. In this way, the different values of the element value contributions indicate the relative desirability of the different potential values that an element may have.

The element value contributions may be selected across the element in a way that normalizes the different element conditions. This is possible because the element value contributions reflect a numerical assessment of the desirability a given element when a certain condition exists. Like numerals may be used to represent like desirability levels across the different element types. FIGS. 4B and 4C as shows the element value contributions determined for the other elements: average monthly precipitation in FIG. 4B in Table 406, average daily dew point in FIG. 4B in table 408, average wind speed in FIG. 4B in table 410, and average daily cloud cover in FIG. 4C in table 412.

Next, one or more historical values are determined for each element in FIG. 4C in table 414. The historical records could, as an example, reveal that in spring, in Atlanta, the average monthly temperature is 70 degrees Fahrenheit, the average monthly precipitation is 0.5 inches, the average daily dew point is 60 degrees Fahrenheit, the average wind speed is 15 miles per hour, and the average daily cloud cover is 30 percent. Note that the average daily cloud cover could be calculated from historical climate data showing an average of 9 cloudy days per month during the spring in Atlanta. These values are combined to calculate an average daily cloud cover value of 30% or 27 days out of the approximately 91 days in the season. Accordingly, the historical data does not have to match exactly to the elements used if a useful conversion is available. Also note that the historical values may be correlated or otherwise associated with potential value as described above by, for example, rounding. If the actual historical climate-based value of the average temperature was 67 degrees Fahrenheit, this value could be rounded up to match the potential value 70 degrees Fahrenheit.

In FIG. 4C in table 414, a historical element value contribution is determined for each element by selecting the element value contribution corresponding to the historical value determined for that element. For example, the historical value of an average daily temperature of 70 degrees Fahrenheit corresponds to an element value contribution of 35 as shown in table 404, the historical value of average monthly precipitation of 0.5 inches corresponds to an element value contribution of 23 as shown in table 406, etc. Thus, the element value contribution tables 404, 406, 408, 410, and 412 are used to determine historical element value contribution values, which are contribution values corresponding to the historical element values.

These values are used to determine an impact value for each element. The impact for each element is determined, as shown in FIG. 4C in table 414, by multiplying the historical element value contribution of each element by the element influence weight associated with that element. For example, for average daily temperature, the historical element influence value 35 is multiplied by the element influence weight of 35% to yield an impact value of 12.25. This is repeated for each element as shown in FIG. 4C in table 414. The impact values of all of the elements are next combined to yield an index value of 21.15.

In this way, an impact value for attending an outdoor sporting event in Atlanta in the Spring is calculated. Impact values for each of the other three seasons could be calculated and the results compared to determine which of the four seasons yields the best index value and thereby determining the best season of the year to attend an outdoor sporting event in Atlanta.

The determination may be performed for periods of different lengths in addition to each of the four seasons. For example, as shown in FIG. 5, an activity index value may be calculated for each month of the year, and used to determine the best and worst months of the year for the given activity. The determinations may be tailored to answer the specific question posed by a user. In this case, the determinations may answer what month of the year is the best time to visit St. Thomas in the United States Virgin Islands.

D. Climate-Based Factors

Many different types of historical climate-based data may be used to determine an index value. For example, historical climate data may include but is not limited to climate data on one or more of temperature, precipitation, humidity, cloud cover, dew point, pressure, lightning, wind speed, visibility, the number of sunny days per month, the number of rainy days per month, or number of snowy days per month.

E. Non-Climate-Based Factors

Many different types of non-climate data may also be used. For example, astronomical data such as information about the sunset, sunrise, hours of light, moon, and tides, may be used. Business data such as average airport delays and environmental data such as pollen counts, CDC warnings, EPA warnings, UVA index values, and water temperature data may also be used. The non-climate data may also include farming data, school attendance, closing, and tourism data such as data about crowds, travel time, and traffic statistics. Legal data such as hunting and fishing season data may be accounted for. Essentially, any recorded or statistical data that can be associated as an element affecting the desirability of an activity may be used.

F. User Preferences/Customization

Another aspect of some embodiments of the present invention is that the determination may be customized to meet the specific needs, requirements, or tastes of a particular user. The user might define the background calculation values used to calculate the index values. For example, the list of elements, potential element values, element influence weights, and/or element value contributions may be based on a user's preferences. These user preferences may be received from the user as part of a request from the user for the activity index value, retrieved from a database, or otherwise determined or retrieved.

G. More Examples

One embodiment of the present invention uses activity index values to determine the worst time to do something or the worst time for something. As examples in the health area, a worst time for aches and pains may be based on climatology data showing rapid temperature and pressure changes, a worst time for allergies may be based on pollen season data, a worst time for colds or flu may be based in part on Center for Disease Control statistics related to peak times, a worst time for asthma or smog concerns might be based on temperature or air stagnation climatology data. The activity index data could also indicate the best time to experience a negative event. For example, a best time to get a sunburn value could be based on UV, sun angle, temperature, and cloud cover climatology data. Thus, the activity index value calculations possible through different embodiments of the present invention can provide information on aches and pains, allergies, colds and flu, air quality, skin protection and other health topics or channels.

Embodiments of the present invention may also provide information relevant to home and garden topics or channels. For example, best time to paint or pressure wash recommendations could be based on rain, cloud cover, and humidity climatology data. Best time to plant could be based on a variety of climatology and non-climatology elements. Best time to get Christmas trees or have an Easter egg hunt could likewise be based on a variety of factors. Sporting event and special event recommendations could also be determined based on a variety of different factors.

Recreation recommendations of all sorts are possible. For example, a best time to play golf or to ski could be determined using a variety of climatology and non-climatology data. These calculations may include a short-term weather forecast-based component in addition to a longer-term climate-based component. As another example, a best time to boat may be based on average water temperatures, wind, and cloud cover data. Other recreational activities from sports to visiting to picnicking may be associated with best time to calculations.

Travel information forms another category or channel of best time to recommendation determinations. For example, the worst time for weather based delays may be determined using climatology data. As other examples, the best time to visit, best time to have a scenic drive, the worst time for interstate travel may be calculated using climate and non-climate elements that effect the desirability of these activities.

The activities and elements described above are intended to illustrate the vast array of potential uses of the methods of the present invention and are not meant to limit or define any particular application of those methods.

H. Benefits and Advantages

There are many benefits to the methods of the present invention. First, the methods provide or allow for a quantitative assessment of the desirability of particular activities based on climate and non-climate historical data. Moreover, the quantitative nature of the determinations adds objectivity by breaking down or decomposing a complex evaluation (determination of climate based desirability) into more manageable and predictable pieces (the individual elements affecting the activity). In other words, the subjectivity is moved from the higher, more general, and more abstract level to the more specific, tangible level of individual elements. Historical climate and non-climate data corresponding to these individual elements may then be used to objectively quantify the desirability of the activity based on predictions using the historical records for those elements.

An additional benefit of the present method includes the benefits of using historical climate data. One particular benefit of using historical climate data is that seasonal changes can be accounted for. For example, historical climate data may show seasons in a particular area, location, or region having distinct characteristics. For example, some areas may have a rainy season during their summer months. Historical data will show the existence of this rainy season and may be used to predict that in future years, the summer months in that area or region will have a high chance of precipitation on a daily basis.

Another advantage of using historical climate data is that such data may illustrate changes occurring every several years. One example, of this type of climate data is El Niño. Historical data, tracking the El Niño patterns and cycles, may be used to predict the weather conditions in regions affected by those shifting weather conditions.

Another advantage of the present invention is the conversion of average values to likelihood values. For example, average monthly rainfall may be converted to a daily percentage chance of rain. This conversion may be based on historical correlations between average rainfall values and the number of days per month that rain occurs. For example, 10 inches of rain may correlate to 15 days of rain in a month that in turn may correlate approximately to a 50% chance of daily rain.

Yet another advantage of the present invention is the ability to customize the determination of an activity index to different levels of granularity, potentially any level of granularity. For example, by selecting a small number of elements affecting an activity, a high level determination of desirability may be made. Alternatively, by selecting a larger number of elements a finer grained determination may be accomplished. Likewise, other values among the background calculation values may be adjusted to provide a more or less granular determination. Additionally, the size of the search or target location may be adjusted to control the granularity of the determination. For example, the methods of the present invention may be used to determine the best or worst time to visit the Caribbean, at a finer granularity, may be used to determine the best or worst time to visit St. Lucia, an island in the Caribbean, a particular city such as Kingston, Jamaica, or even a particular zip code.

Another advantage of some embodiments of the present invention is that climate and non-climate data may be combined to produce "best time to" recommendations that take additional, non-climate factors into account. For example, a user may desire to know the best time to visit Kingston, Jamaica on a budget. The time of year having the best weather conditions may not, and very likely will not, be the time of year in which travel to Kingston, Jamaica is most economical. Certain methods of the present invention allow non-climate data, such as average hotel price, to be taken into account in determining the desirability of the activity at different points in the year. For example, the method may determine that visiting St. Lucia in May has favorable weather conditions but not necessarily the best conditions during the year because of a slightly increased chance of precipitation in May. However, a method of determining an activity index value for St. Lucia that takes into account non-climate cost factors, may actually recommend this time of year to the thrifty user.

Other advantages and benefits to the present invention are described elsewhere herein or are otherwise apparent.

ALTERNATIVE EMBODIMENTS

The foregoing description of the exemplary embodiments of the invention has been presented only for the purposes of illustration and description and is not intended to be exhaustive or to limit the invention to the precise forms disclosed. Many modifications and variations are possible in light of the above teaching. For example, the number of years of data collected for the climate data could be any number of years. As another example, a method of the present invention could take into consideration the current weather cycle so that rather than considering all data for the last 20 years, only data corresponding to the current cycle and previous similar cycles are used. Moreover, it should be understood that the form and content of the tables presented in FIG. 4 are exemplary and that many variations are possible within the scope of the present invention. The embodiments were chosen and described in order to explain the principles of the invention and their practical application so as to enable others skilled in the art to utilize the invention and various embodiments and with various modifications as are suited to the particular use contemplated. Many alternative embodiments are possible without departing from the spirit and scope of the invention.

What is claimed is:

1. A method of providing to a user an activity index value indicating a numerical score for an activity in a location during a time period for use in comparing to another activity index value for the same or another activity, in the same or another location, at the same or a different time period, wherein the comparison of activity index values allows comparison based on historical-climate data, the method comprising:
   determining a plurality of elements having a potential impact on the activity;
   determining an element influence weight for each element, wherein the element influence weight indicates the potential impact of each element on the activity;
   for each element:
      determining a historical value for the location and the time period; and
      determining an element value contribution corresponding to the historical value,
   wherein at least one of the historical values corresponds to historical climate data;
   determining an activity index value for the activity based on the elements, element influence weights and the element value contributions, wherein each element value contribution is weighted in accordance with its corresponding element influence weight; and
   providing the activity index value to the user via an output device.

2. The method of claim 1, wherein for a selected element, the relationship between the historical values and the element value contributions is non-linear.

3. The method of claim 1 wherein the historical climate data is selected from the group consisting of temperature, precipitation, humidity, cloud cover, dew point, pressure, lightning, wind speed, visibility, the number of sunny days per month, the number of rainy days per month, or number of snowy days per month.

4. The method of claim 3 wherein the time period is one of the seasons: spring, summer, fall, or winter.

5. The method of claim 3 wherein the time period is a month of the year.

6. The method of claim 1 wherein the element influence weights are percentages that collectively add to 100%.

7. The method of claim 1 wherein the historical climate data is based on 30 years of recorded climatology data.

8. The method of claim 1 wherein one or more of the element value contributions are determined after converting the historical value to a daily percentage.

9. The method of claim 1 wherein at least one of the elements is a climate-based element based on historical climate data and at least one element is non-climate-based element based on historical non-climate data.

10. The method of claim 9 wherein the non-climate-based data is selected from the group consisting of sunset time, sunrise time, hours of light, phase of the moon, ocean tide, airport delays, pollen condition, Center for Disease Control reports, Environmental Protection Agency ozone alerts, Ultra-violet index values, historical planting data, school attendance records, school closing records, tourism data, traffic, legal data, hunting data, fishing data, water temperature data or astronomical data.

11. A method of recommending a time for an activity based on comparison of numerical scores that account for activity, location, historical climate data, and two or more candidate time periods, the method comprising:
   determining a plurality of elements having a potential impact on the activity, wherein at least one of the elements is a climate-based element;
   for each element:
      determining an element influence weight, wherein the element influence weight indicates the relative impact of each element on the activity;
      determining a plurality of potential values based on historical values; and
      for each potential value, determining an element value contribution; and
   for each of the two or more candidate time periods, determining an activity index, wherein the activity index is based on the elements, element influence weights and the element value contributions, and wherein each element value contribution is weighted in accordance with its corresponding element influence weight; and
   providing to the user via an output device, a recommended time period determined based on comparison of the activity index value of each time period.

12. The method of claim 11 wherein the list of elements, potential element values, element influence weights, and element value contributions are based at least in part on user preferences.

13. The method of claim 12 wherein the user preferences are retrieved from the user as part of a request from the user for the activity index value.

14. The method of claim 12 wherein the preferences of the user are retrieved from a database.

15. The method of claim 11 wherein the element influence weights are percentages that collectively add to 100 percent for each element.

16. The method of claim 11 wherein the list of elements, potential element values, element influence weights, and element value contributions are stored in a database.

17. A method of providing to a user a recommended time to do an activity based on comparison of numerical scores that account for activity, location, historical climate data, and two or more candidate time periods, the method comprising:

identifying a location, an activity, a time period, and a time span, wherein the time span includes the two or more candidate time periods;

for each of the two or more candidate time periods, determining an index value for the activity and location using two or more elements each having an element influence weight, and wherein one or more elements corresponds to historical climate data; and selecting a recommended time period based on comparison of the activity index values determined for each of the two or more candidate time periods; and providing the recommended time period to the user via an output device.

18. The method of claim 17 wherein the time period is a month and the time span is a year.

19. The method of claim 17 wherein the index values are retrieved from a stored database.

20. The method of claim 17 wherein the time increment and time span are retrieved from a user.

21. The method of claim 17 further comprising displaying the best-time-to time period to a user on a computer.

* * * * *